United States Patent
Maeda et al.

[11] Patent Number: 6,093,925
[45] Date of Patent: Jul. 25, 2000

[54] REEL SENSOR AND START/FINISH END DETECTING DEVICE

[75] Inventors: Osamu Maeda; Kunio Sawai, both of Osaka, Japan

[73] Assignee: Funai Electric Co., Ltd., Osaka, Japan

[21] Appl. No.: 08/924,666

[22] Filed: Sep. 5, 1997

[30] Foreign Application Priority Data

Sep. 6, 1996 [JP] Japan .................................. 8-236683

[51] Int. Cl.⁷ .................................................. G11B 15/18
[52] U.S. Cl. ................................ 250/222.1; 250/559.29; 360/74.2; 360/74.1; 242/333
[58] Field of Search ........................... 250/222.1, 231.13, 250/559.12, 227.28, 227.11; 360/74.6, 74.1, 74.2; 242/333, 333.1, 333.2

[56] References Cited

U.S. PATENT DOCUMENTS

| | | | |
|---|---|---|---|
| 5,311,030 | 5/1994 | Higuchi et al. | 250/559.29 |
| 5,517,480 | 5/1996 | Matsuoka et al. | 369/110 |
| 5,519,675 | 5/1996 | Toofan | 369/13 |
| 5,600,504 | 2/1997 | Seo | 360/74.2 |
| 5,625,516 | 4/1997 | Kushiro | 360/132 |
| 5,659,435 | 8/1997 | Han | 360/742 |
| 5,729,006 | 3/1998 | Maeda | 250/231.13 |
| 5,775,615 | 7/1998 | Ahn | 242/333.2 |

FOREIGN PATENT DOCUMENTS

| | | |
|---|---|---|
| 58-218088 | 12/1983 | Japan . |
| 7-230642 | 8/1995 | Japan . |
| 8-129794 | 5/1996 | Japan . |

Primary Examiner—Edward P. Westin
Assistant Examiner—Thanh X. Luu
Attorney, Agent, or Firm—Morgan, Lewis & Bockius LLP

[57] ABSTRACT

In a reel sensor for a start/finish and detecting device in which a light from a light-emitting element is radiated into an incident light window formed in a video cassette and a start/finish end of a video tape is detected based on an intensity of a light radiated from an emergent light window formed in the video cassette, the reel sensor comprises: a light-distributing section for distributing the light radiated from the light-emitting element to a rotation indicator so as to correspond to the rotation of a reel stand, the rotation indicator serving to change an intensity of the light either transmitting therethrough or being reflected thereby; and a light-receiving section for receiving the ray of light having been distributed by the light-distributing section and either having transmitted through the rotation indicator or having been reflected by the rotation indicator.

24 Claims, 8 Drawing Sheets

REEL SENSOR AND START/FINISH END DETECTING DEVICE

BACKGROUND OF THE INVENTION

The invention relates to reel sensors and start/finish end detecting devices for detecting a start/finish end of a video tape.

If a video tape is left to travel continuously when the finish end thereof nears, a leader portion of the video tape comes in contact with the rotary head, so that the rotary head is likely to be damaged. Further, if the video tape is wound continuously even when the finish end thereof has appeared, the video tape may likely to be torn. To overcome these problems, a video cassette deck is equipped with a start/finish end detecting device.

Further, in order to detect the type of recording time, remaining time, and the like of a video tape or in order to minimize chances of the video tape being damaged by detecting defective winding based on a ratio in the number of revolutions between a reel stand on the supply side and a reel stand on the wind side, a reel sensor is additionally provided.

Figure 9:
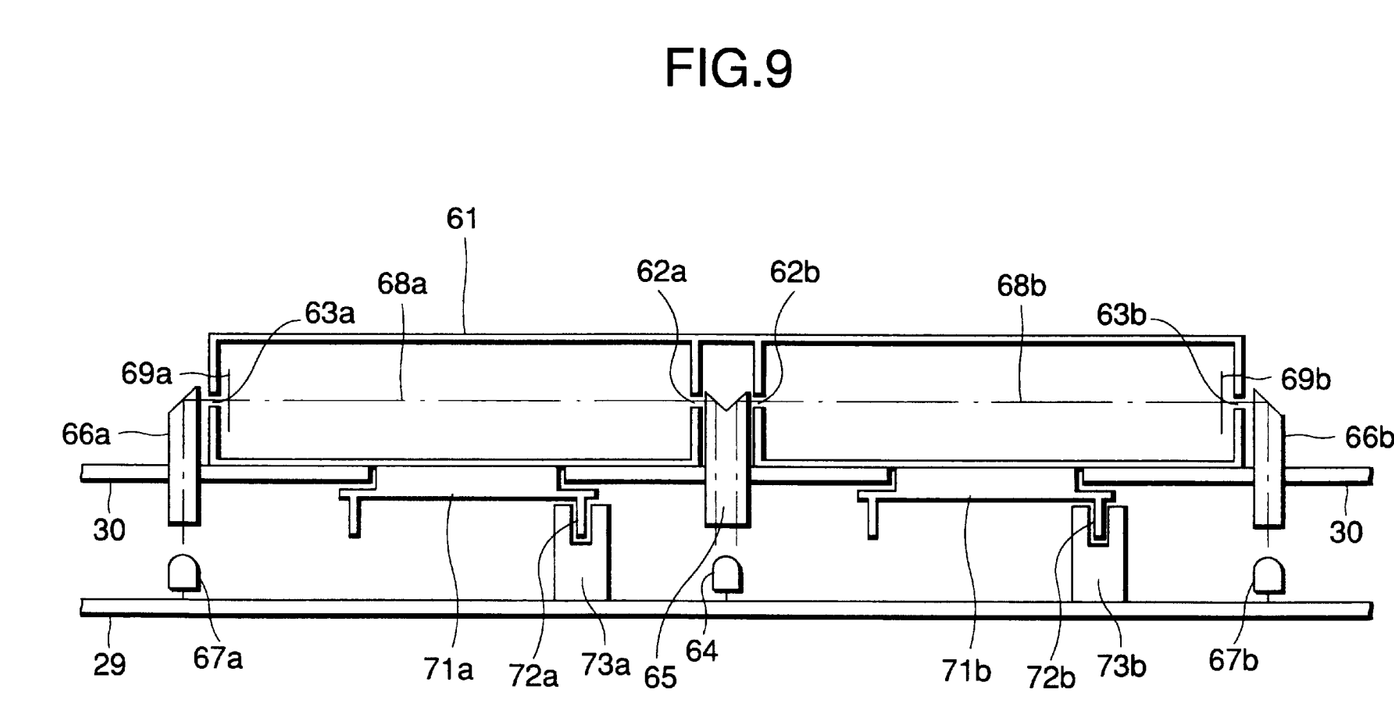
FIG. 9 is a sectional view outlining a conventional example.

FIG. 9 is a sectional view outlining a start/finish end detecting device and a reel sensor, which are conventional examples.

More specifically, the start/finish end detecting device includes: a light-emitting element 64 that radiates an infrared ray upward; a light-emitting side prism 65 that reflects the infrared ray radiated from the light-emitting element 64 in horizontal directions and radiates the infrared rays to incident light windows 62a, 62b formed in a video cassette 61; light-receiving prisms 66a, 66b that reflects the infrared rays radiated from emergent light windows 63a, 63b downward; and light-receiving elements 67a, 67b that receive the infrared rays reflected by the light-receiving prisms 66a, 66b.

That is, when the magnetic substance applied portion of a video tape is travelling, a video tape 69a, 69b that crosses the optical paths 68a, 68b of the infrared rays is opaque. For this reason, the infrared rays radiated from the light-emitting element 64 are shielded by the video tape 69a, 69b, thereby not reaching the light-receiving elements 67a, 67b. On the other hand, when the leader portion appears after the magnetic substance applied portion has ended, the video tape 69a, 69b become transparent, which in turn allows the infrared rays radiated from the light-emitting element 64 to be received by the light-receiving elements 67a, 67b. As a result, start/finish ends of the video tapes can be detected by the outputs of the light-receiving elements 67a, 67b.

The reel sensor includes: a plurality of light-shielding blades 72a, 72b formed on the lower surfaces of reel stands 71a, 71b; and photo-interrupters 73a, 73b that detect the passing of the light-shielding blades 72a, 72b.

That is, when the reel stands 71a, 71b are rotating, the light-shielding blades 72a, 72b cross the slits of the photo-interrupters 73a, 73b. As a result, pulses are generated as the outputs of the photo-interrupters 73a, 73b every time the light-shielding blades 72a, 72b pass the photo-interrupters. The pulses are generated at a time interval corresponding to the rotational speeds of the reel stands 71a, 71b. As a result, the rotational speed of each of the reel stands 71a, 71b is calculated based on the time interval at which the pulses are generated. Further, it if no pulses appear at the outputs of the photo-interrupters 73a, 73b although pulses must appear, then it means that the reel stands 71a, 71b are defectively rotating, so that occurrence of such an abnormality as defective winding or torn tape is indicated.

However, in the aforementioned construction, the start/finish end detecting device requires a single light-emitting element 64 and two light-receiving elements 67a, 67b. Further, the reel sensor requires that the photo-interrupters 73a, 73b be provided for the respective reel stands 71a, 71b. That is, each of the reel stands 71a, 71b requires a single light-emitting element and a single light-receiving element.

That is, if both the start/finish ends of the video tape and the rotational speeds of the reel stands 71a, 71b are to be detected, three (3) light-emitting elements and four (4) light-receiving elements must be provided. On the other hand, the light-emitting elements and the light-receiving elements are energy converting elements from light to electricity and vice versa, and therefore expensive. For this reason, the construction requiring the three light-emitting elements and the four light-receiving elements has increased the manufacturing cost.

SUMMARY OF THE INVENTION

The invention has been made to overcome the aforementioned problems. An object of the invention is to provide a reel sensor that can reduce the number of light-emitting elements used by sharing a light-emitting element for detecting the rotation of a reel stand in common with a start/finish end detecting device.

Another object of the invention is to provide a reel sensor that can facilitate the formation of an optical path when a ray of light from the light-emitting element used for detecting a start/finish end is used also for detecting the rotation of a reel stand, in addition to the aforementioned object.

Another object of the invention is to provide a reel sensor that can prevent impairment in operating accuracy, in addition to the aforementioned objects.

A still further object of the invention is to provide a reel sensor that can shorten the optical path when a ray of light from the light-emitting element used for detecting a start/finish end is used also for detecting the rotation of a reel stand.

A still further object of the invention is to provide a start/finish end detecting device that can reduce the number of light-receiving elements used by sharing a light-receiving element used for detecting a start/finish end in common for detecting the rotation of a reel stand.

A still further object of the invention is to provide a start/finish end detecting device that can facilitate the formation of an optical path when the light-receiving element used for detecting a start/finish end is shared in common for detecting the rotation of a reel stand, in addition to the aforementioned object.

To overcome the aforementioned problems, a reel sensor according to the invention is applied to a start/finish end detecting device for radiating a ray of light into an incident light window formed in a video cassette and detecting a start/finish end of a video tape based on an intensity of a ray of light radiated from an emergent light window formed in the video cassette. Such reel sensor includes: a light-distributing section for distributing a ray of light radiated from a light-emitting element disposed on the start/finish end detecting device to a rotation indicator so as to correspond to the rotation of a reel stand, the rotation indicator serving to change an intensity of a ray of light either transmitting therethrough or being reflected thereby; and a light-receiving section for receiving a ray of light having been distributed by the light-distributing section and either having transmitted through the rotation indicator or having been reflected by the rotation indicator. That is, the ray of light radiated from the light-emitting element disposed on the start/finish end detecting device is not only radiated to the incident light window in order to detect a start/finish end, but also radiated to the rotation indicator by the light-distributing section. As a result, the reel sensor can detect the rotation of a reel stand without using a dedicated light-emitting element.

Further, in addition to the aforementioned construction, the light distributing section is a light-distributing prism having a reflecting surface formed thereon, the reflecting surface refracting a ray of light radiated from the light-emitting element toward the rotation indicator; and a light-emitting side prism being disposed on the start/finish end detecting device and refracting the ray of light radiated from the light-emitting element toward the incident light window is formed integrally with the light-distributing prism. That is, an optical path for detecting a start/finish end and an optical path for detecting the rotation of a reel stand can be formed by a single integrated component.

Further, in addition to the aforementioned constructions, a light-guiding section for guiding the ray of light distributed by the light-distributing section to a position close to the rotation indicator. That is, the ray of light for detecting the rotation of a reel stand is radiated at a position close to the rotation indicator. Therefore, unnecessary radiation can be minimized. As a result, an increase in the amount of light entering around the light-receiving element can be regulated.

Further, in addition to the aforementioned constructions, the rotation indicator is constructed of light-shielding blades disposed on a gear rotating so as to interlock with the reel stand. That is, if the gear on which the light-shielding blades are disposed is located closer to the reel stand as viewed from the side of the light-emitting element, the distance from the light-emitting element to the light-shielding blades on the gear becomes shorter than the distance from the light-emitting element to the light-shielding blades on the reel stand.

Further, a start/finish end detecting device according to the invention is applied to a start/finish end detecting device for radiating a ray of light into an incident light window formed in a video cassette and detecting a start/finish end of a video tape based on an intensity of a ray of light radiated from an emergent light window formed in the video cassette. Such start/finish end detecting device includes: a light-receiving element for receiving the ray of light radiated from the emergent light window; a reel sense light-guiding section for guiding a ray of light having transmitted through a rotation indicator or having been reflected by the rotation indicator to the light-receiving element, the rotation indicator serving to change an intensity of a ray of light either transmitting therethrough or being reflected thereby; a comparing section for generating a reel sense signal by slicing an output of the light-receiving element at a preset level; and a detected signal generating section for generating a detected signal indicating detection of the start/finish end when a light-receiving period indicated by the reel sense signal becomes longer than a preset period. That is, the light-receiving element for detecting the rotation of a reel stand is used also as the light-receiving element for detecting a start/finish end. As a result, a light-receiving element used for detecting the rotation of a reel stand can be dispensed with. On the other hand, the reel sense signal and the detected signal indicating detection of a start/finish end are mixed at the output of the comparing section. As a result, the detected signal generating section separates the reel sense signal from the detected signal indicating detection of a start/finish end based on the light-receiving period indicated by the reel sense signal.

Further, in addition to the aforementioned construction, the start/finish end detecting device further includes: a light-receiving prism for refracting the ray of light radiated from the emergent light window in a light-receiving direction. In such start/finish end detecting device, the reel sense light-guiding section is a light-guiding prism for refracting a ray of light either having transmitted through the rotation indicator or having being reflected by the rotation indicator in a light-receiving direction of the light-receiving element, the light-receiving prism and the light-guiding prism being formed integrally with each other. That is, a light receiving path for detecting a start/finish end and a light-receiving path for detecting the rotation of a reel stand are formed by a single integrated component.

DETAILED DESCRIPTION OF THE PREFERRED EMBODIMENTS

Embodiments of the present invention will now be described with reference to the drawings.

Figure 1:
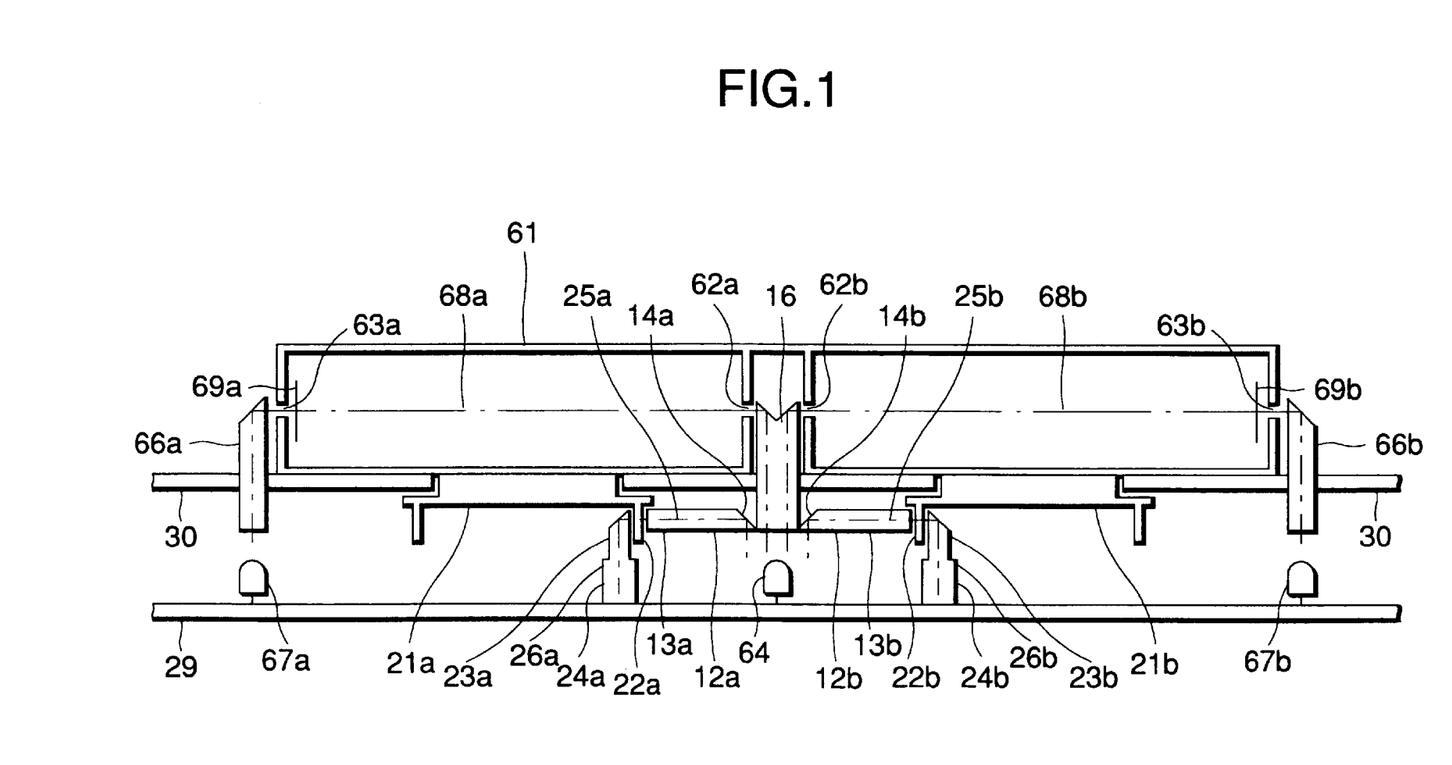
FIG. 1 is a sectional view outlining a reel sensor according to an embodiment of the present invention.

FIG. 1 is a sectional view outlining a reel sensor, which is an embodiment of the invention. Specifically, FIG. 1 shows a reel sensor mounted on a video cassette deck. It may be noted that the same parts and components as those of the conventional example shown in FIG. 9 are denoted by the same reference characters.

In FIG. 1, a start/finish end detecting device for detecting a start/finish end of a video tape includes a light-emitting element 64, a light-emitting side prism 16, light-receiving prisms 66a, 66b, and light-receiving elements 67a, 67b.

More specifically, the light-emitting element 64 is an infrared light-emitting diode that emits light (infrared rays) upward. Further, the light-emitting side prism 16 is a prism that reflects an infrared ray radiated from the light-emitting element 64 in horizontal directions and injects the reflected infrared rays into incident light windows 62a, 62b formed in a video cassette deck 61. Further, the light-receiving prisms 66a, 66b are prisms that reflect the infrared rays radiated in the horizontal directions from emergent light windows 63a, 63b downward. Further, the light-receiving elements 67a, 67b are infrared phototransistors that receive the infrared rays reflected downward by the light-receiving prisms 66a, 66b.

It may be noted that reference characters 68a, 68b denote the optical paths of infrared rays in the start/finish end detecting device and that reference characters 69a, 69b denote a video tape positioned at the optical paths 68a, 68b of the infrared rays.

The reel sensor includes light-distributing sections 12a, 12b, rotation indicators 22a, 22b, and light-receiving sections 26a, 26b.

More specifically, the light-distributing sections 12a, 12b are light-distributing prisms (to be described later) that distribute an infrared ray radiated upward from the light-emitting element 64 constituting the start/finish end detecting device toward the rotation indicators 22a, 22b. Further, the rotation indicators 22a, 22b are constructed of a total of eight (8) light-shielding blades disposed on the lower surfaces of reel stands 21a, 21b, and change the intensities of rays of light that have transmitted therethrough so as to correspond to the rotation of the reel stands 21a, 21b. Further, the light-receiving sections 26a, 26b are blocks that receive the infrared rays that have been distributed by the light-distributing sections 12a, 12b and that have transmitted through the rotation indicators 22a, 22b.

The light-receiving sections 26a, 26b comprise prism sections 23a, 23b that reflect the horizontally radiated infrared rays downward and light-receiving section main bodies 24a, 24b that have light-receiving elements (not shown) for receiving the downwardly reflected infrared rays arranged therein. It may be noted that reference characters 25a, 25b denote the optical paths of infrared rays in the reel sensor.

It may also be noted that the light-distributing sections (light-distributing prisms) 12a, 12b are formed integrally with the light-emitting side prism 16 as will be described later, and the light-emitting side prism 16 and the light-distributing sections (light-distributing prisms) 12a, 12b that have been integrated with each other and the light-receiving prisms 66a, 66b are fixed to a chassis section 30 of which the reel stands 21a, 21b and the like are mounted. Further, it may be noted that reference numeral 29 denotes a main board on which the light-emitting element 64, the light-receiving elements 67a, 67b, the light-receiving sections 26a, 26b, and the like are mounted.

Figure 2:
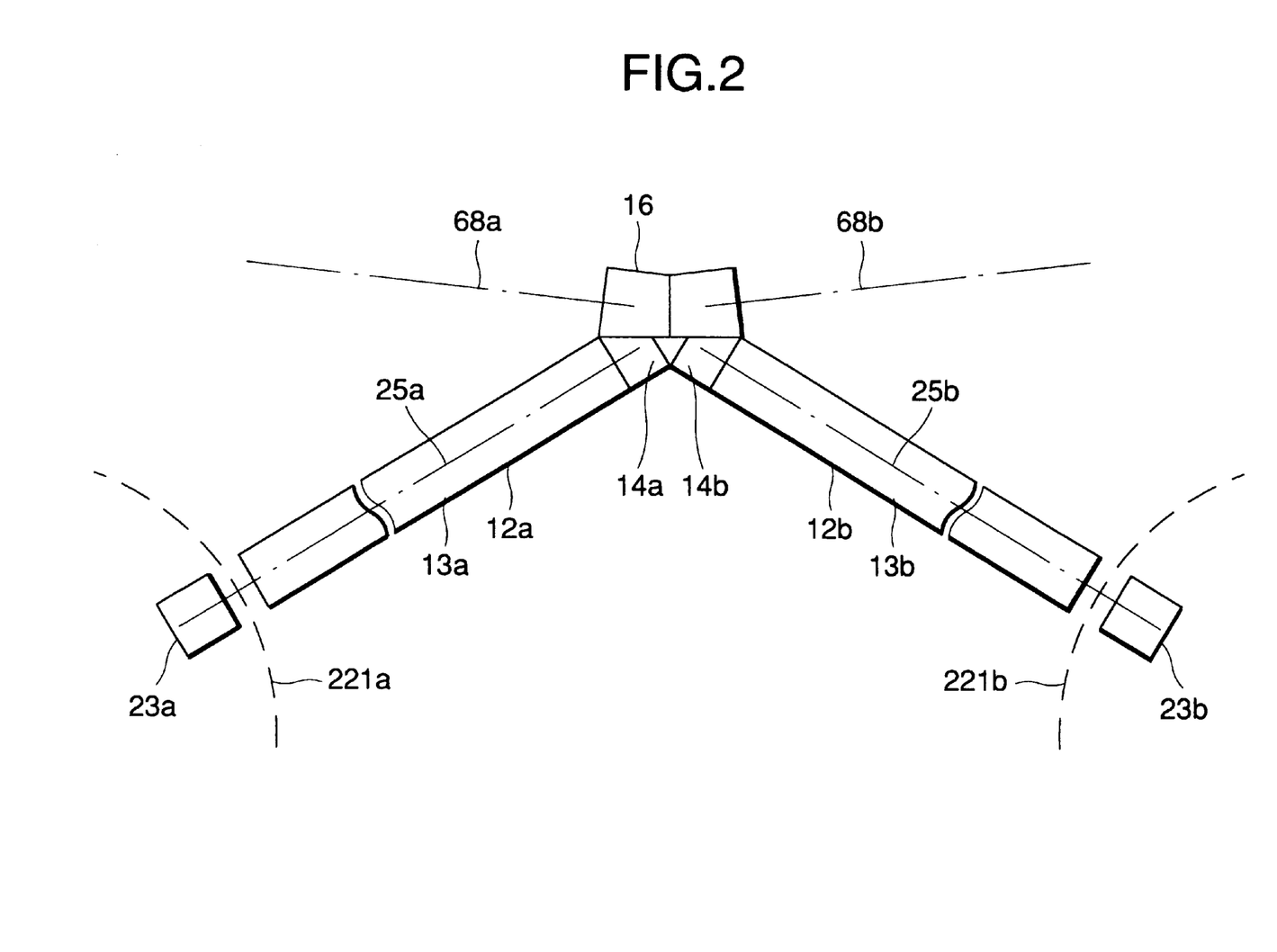
FIG. 2 is a plan view showing the detailed shape of a light-emitting side prism and that of a light-distributing prism.
Figure 3:
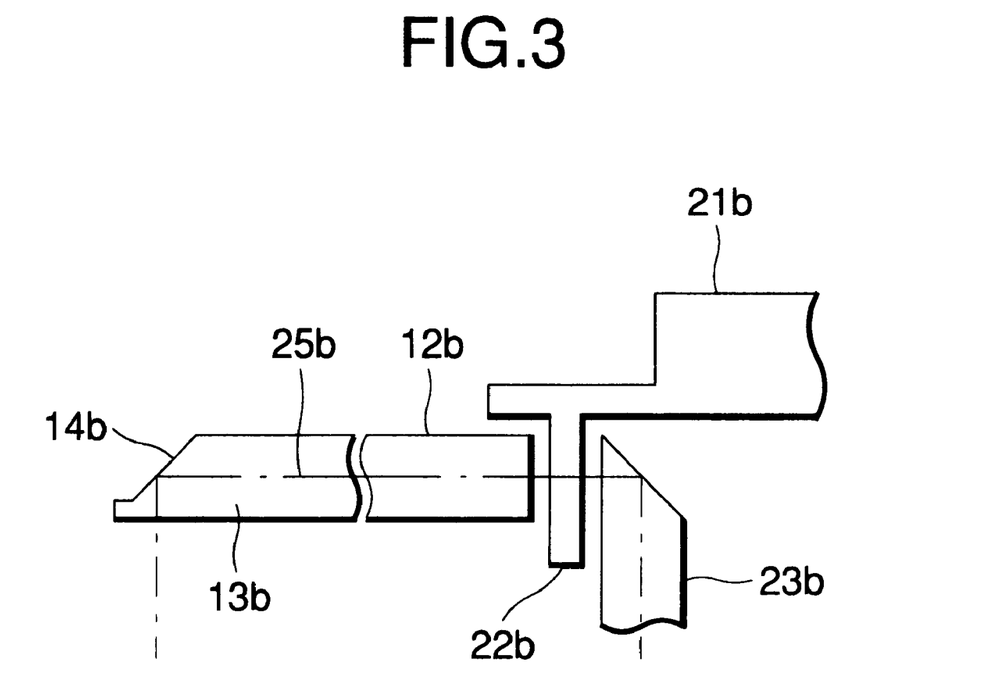
FIG. 3 is a sectional view showing the detailed shape of the light-distributing prism.

FIG. 2 is a plan view showing the detailed shape of the light-emitting side prism 16 and that of the light-distributing prisms 12a, 12b. Further, FIG. 3 is a sectional view (taken along a portion 25b) showing the detailed shape of the light-distributing prism 12b. It may be noted that the shape of the light-distributing prisms 12a, 12b shown in FIG. 1 does not strictly correspond to the shapes shown in FIGS. 2 and 3 since FIG. 1 is only a general sectional view.

The light-distributing prisms 12a, 12b that serve as light-distributing sections have reflecting surfaces 14a, 14b and light-guiding sections 13a, 13b formed thereon.

More specifically, the reflecting surfaces 14a, 14b are inclined surfaces that reflect an infrared ray radiated upward from the light-emitting element 64 toward the rotation indicators 22a, 22b (in the horizontal directions). Further, the light-guiding sections 13a, 13b are blocks that guide the infrared rays refracted in the horizontal directions by the reflecting surfaces 14a, 14b to positions close to the light-shielding blades 22a, 22b without scattering the infrared rays on their way. The light-guiding sections are constructed of square solid arms that extend to positions close to the light-shielding blades 22a, 22b.

Further, the light-distributing prisms 12a, 12b are formed integrally with the light-emitting side prism 16, which is a component of the start/finish end detecting device, in order to facilitate the formation of optical paths that guide the infrared ray radiated from the light-emitting element 64 to the positions close to the light-shielding blades 22a, 22b.

It may be noted that broken lines 221a, 221b in FIG. 1 denote moving paths of the light-shielding blades 22a, 22b.

The operation of the thus constructed embodiment will be described.

An infrared ray radiated upward from the light-emitting element 64 is refracted by the light-emitting side prism 16 and injected onto the incident light windows 62a, 62b. The infrared rays radiated from the emergent light windows 63a, 63b via the optical paths 68a, 68b are refracted downward by the light-receiving prisms 66a, 66b and received by the light-receiving elements 67a, 67b. As a result, the outputs of the light-receiving elements 67a, 67b indicate that start/finish ends of the video tape 69a, 69b have been detected.

Further, the infrared ray radiated upward from the light-emitting element 64 is refracted by the reflecting surfaces 14a, 14b of the light-distributing prisms 12a, 12b, and radiated to the light-guiding sections 13a, 13b. The infrared rays radiated to the light-guiding sections 13a, 13b are guided along the light-guiding sections 13a, 13b without being scattered to the outside, and are radiated in the directions of the optical paths 25a, 25b that cross the moving paths of the light-shielding blades 22a, 22b.

The infrared rays radiated in the directions of the optical paths 25a, 25b crossing the moving paths 221a, 221b are refracted downward by the prism sections 23a, 23b when the light-shielding blades 22a, 22b are not positioned on the optical paths 25a, 25b. As a result, the downwardly refracted infrared rays are received by the light-receiving elements disposed inside the light-receiving sections main bodies 24a, 24b. On the other hand, when the light-shielding blades 22a, 22b are positioned on the optical paths 25a, 25b, the infrared rays guided into the light-guiding sections 13a, 13b are shielded by the light-shielding blades 22a, 22b, thereby not reaching the light-receiving elements disposed inside the light-receiving section main bodies 24a, 24b. As a result, the rotational speeds of the reel stands 21a, 21b are indicated by the outputs of the light-receiving elements disposed inside the light-receiving section main bodies 24a, 24b.

Figure 4:
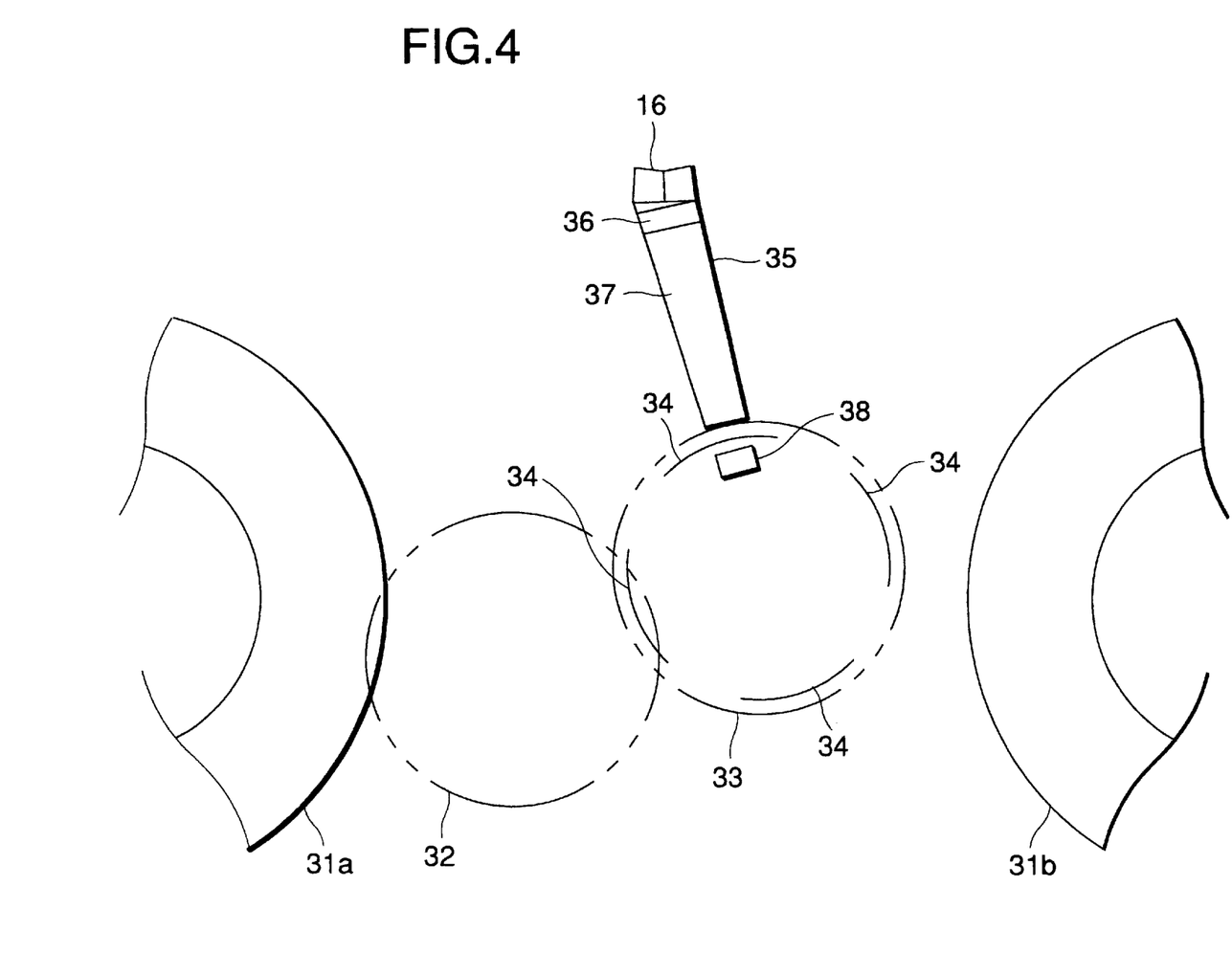
FIG. 4 is a plan view outlining a reel sensor according to another embodiment of the present invention.

FIG. 4 is a plan view outlining a reel sensor according to another embodiment of the invention. It may be noted that the portions of this mode of embodiment are similar to those of the conventional example shown in FIG. 9 except for the light-distributing prisms, the position of the light-receiving sections, and the light-shielding blades.

The real sensor in this embodiment includes a light-distributing prism 35, light-shielding blades 34, and a light-receiving section 36.

More specifically, the light distributing prism 35 is a prism formed integrally with the light-emitting side prism 16, and guides an infrared ray radiated upward from the light-emitting element 64 to a position close to a light-shielding blade 34. As a result, the light-distributing prism 35 has a reflecting surface 36 that reflects the upwardly radiated infrared ray in a horizontal direction is formed. Further, a light-guiding section 37 is also formed so that the infrared ray reflected by the reflecting surface 36 can be guided to a position close to a light-shielding blade 34 without being scattered.

The light-receiving section 38, which is of the same construction as the light-receiving section shown in FIG. 1 (26a or 26b), is a block that reflects the horizontally radiated infrared ray downward and thereafter receives the downwardly refracted infrared ray using a light-receiving element.

A total of four (4) light-shielding blades 34 are formed on the lower surfaces of a gear 33. Further, the gear 33 rotates so as to follow the rotation of a reel stand 31a through a gear 32. Further, the rotational ratio of the gear 33 to the reel stand 31a is set to 2:1. As a result, when the reel stand 31a makes a single revolution, the gear 33 makes two revolutions, which in turn allows the infrared ray to be shielded by the light-shielding blades 34 eight (8) times.

Further, the gear 33 is positioned closer to the light-emitting side prism 16 than the reel stand 31a. As a result, the light-shielding blades 34 are positioned closer to the light-emitting side prism 16 than the light-shielding blades 22a, 22b. As a result, the length of the light-guiding section 37 of the light-distributing prism 35 can be decreased compared with that in the embodiment shown in FIGS. 1 to 3. It may be noted that reference character 31a denote a reel stand that rotates independently of the gear 33.

The operation of the thus constructed embodiment will be described.

An infrared ray radiated upward from the light-emitting element 64 is refracted by the reflecting surface 36 of the light-distributing prism 35, and is radiated to the light-guiding section 37. The infrared ray that has been radiated to the light-guiding section 37 is guided along the shape of the light-guiding section 37 without being scattered to the outside, and is radiated in the direction of an optical path that crosses the moving path of a light-shielding blade 34 substantially at a right angle.

The infrared ray that has been radiated in the optical path crossing the moving path of a light-shielding blade 34 substantially at a right angle is received by the light-receiving section 38 when a light-shielding blade 34 is not positioned on the optical path. On the other hand, when a light-shielding blade 34 is positioned on the optical path, the infrared ray radiated from the light-guiding section 37 is shielded by the light-shielding blade 34, thereby not reaching the light-receiving section 38. As a result, the rotation of the reed stand 31a is indicated by the output of the light-receiving element disposed inside the light-receiving section 38.

It may be noted that the output of the light-receiving element at this time becomes equal to an output obtained when a total of eight (8) light-shielding blades is disposed on the reel stand 31a since the rotational ratio of the gear 33 to the reel stand 31a is set to 2:1.

It may also be noted that the start/finish end detecting operation in this mode of embodiment is the same as that in the mode of embodiment shown in FIGS. 1 to 3 and that a description thereof will, thereof, be omitted.

Figure 5:
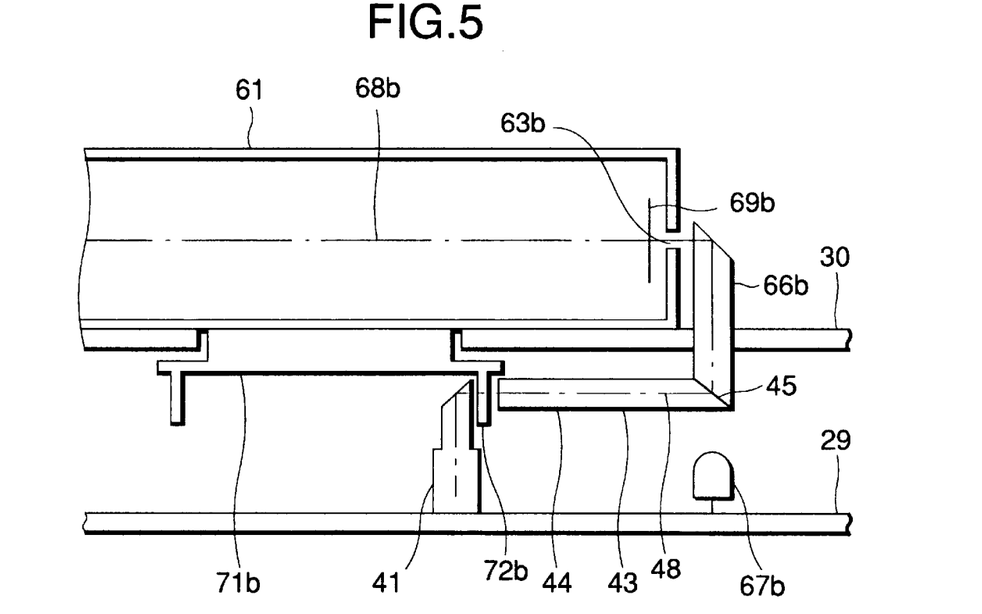
FIG. 5 is a sectional view outlining a light-receiving block of a start/finish end detecting device according to another embodiment of the invention.
Figure 6:
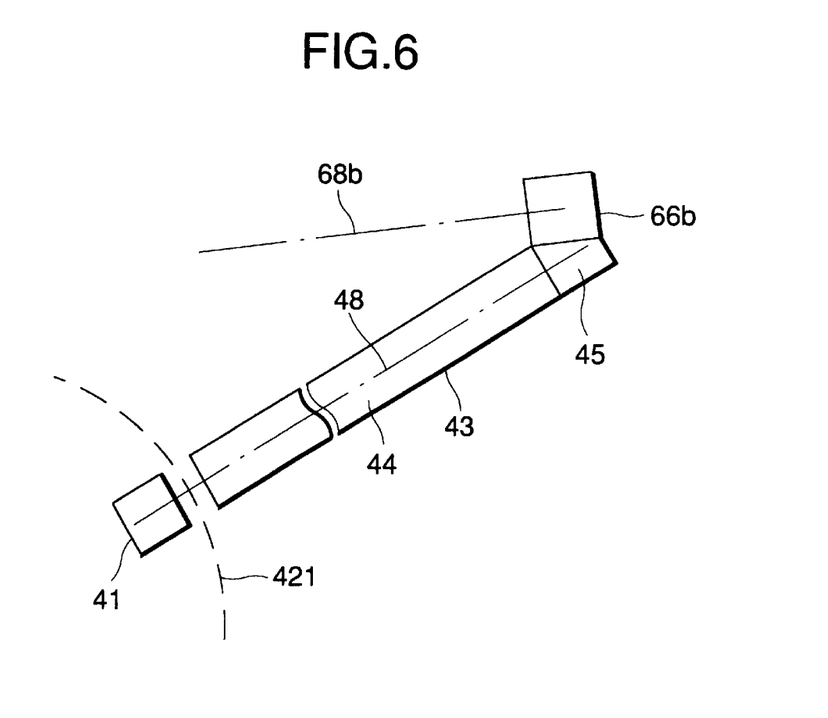
FIG. 6 is a plan view showing the detailed shape of a reel sense light-guiding section.

FIG. 5 is a sectional view outlining a light-receiving block of a start/finish end detecting device according to another embodiment of the present invention. FIG. 6 is a plan view showing the detailed shape of a reel sense light-guiding section. It may be noted that in these drawings, the same parts and components as those shown in FIG. 9 are denoted by the same reference characters.

It may also be noted that a light-emitting side block in this mode of embodiment is the same as the light-emitting side block in the conventional example shown in FIG. 9. Further, while only the construction of the light-emitting element 67b is shown in FIGS. 5 and 6, the construction of the light-receiving element 67a is the same as that shown in FIGS. 5 and 6. It may further be noted that only the light-receiving element 67b will hereunder be described and that a description of the light-receiving element 67a will be omitted.

According to this embodiment of the invention, the light-receiving element 67b that receives an infrared ray injected onto the incident light window 62b and radiated from the emergent light window 63b is shared in common with a light-receiving element serving to detect the rotation of a reel stand 71b. As a result, a reel sense light-guiding section 43 is provided in this embodiment.

The reel sense light-guiding section 43 is a light-guiding prism that guides an infrared ray radiated from a light-emitting section 41 toward the light-receiving element 67b without dispersing. As a result, the reel sense light-guiding section 43 has a light-guiding section 44 and a reflecting surface 45 formed thereon.

The light-guiding section 44 guides the infrared ray radiated from the light-emitting section 41 to a position close to the light-receiving element 67b without being scattered along an optical path 48 that crosses the moving path 421 of a light-shielding blade 72b. Further, the reflecting surface 45 refracts the infrared ray guided by the light-guiding section 44 in a direction of the light-receiving surface of the light-receiving element 67b (in a downward direction).

Further, the reel sense light-guiding section (light-guiding prism) 43 is formed integrally with a light-receiving prism 66b that refracts the infrared ray radiated from the emergent light window 63b in the direction of the light-receiving surface of the light-receiving element 67b (in the downward direction).

That is, the prism disposed for the light-receiving element 67b is a prism formed by integrating the light-receiving prism 66b with the light-guiding prism (reel sense light-guiding section) 43. As a result, the infrared ray is guided to the light-receiving element 67b when the light-shielding blade 72b does not shield the optical path 48 and when a leader portion of the video tape 69b is present.

Figure 7:
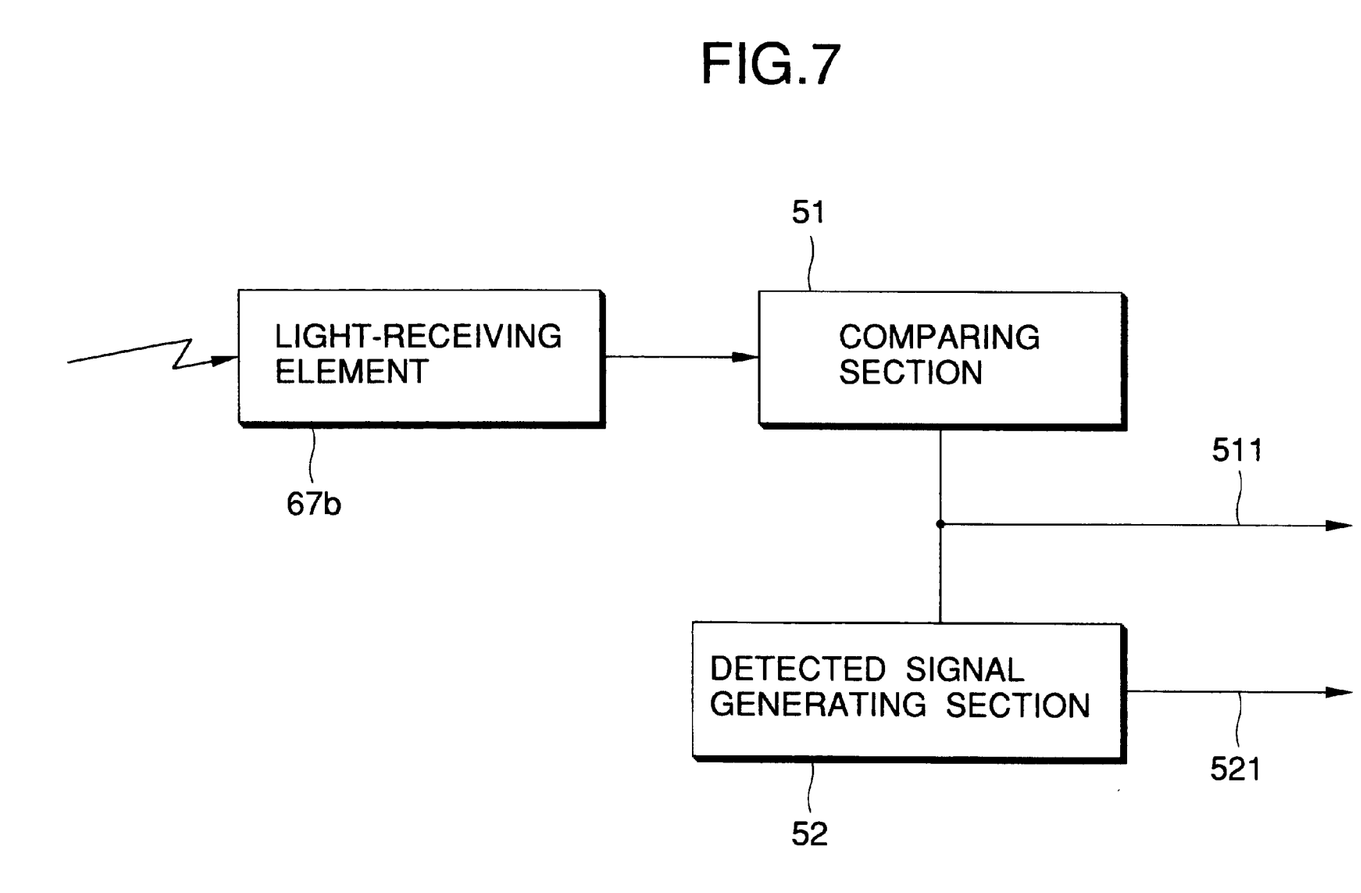
FIG. 7 is a block diagram showing the electric configuration of an output processing block of a light-receiving element.

FIG. 7 is a block diagram showing the electric configuration of a block that processes the output of the light-emitting element 67b.

A comparing section 51 into which an output of the light-receiving element 67b has been introduced in a block for slicing the output of the light-receiving element 67b at a preset level, and generates a reel sense signal 511 that indicates the rotational speed of the reel stand 71b.

Further, a detected signal generating section 52 into which the reel sense signal 511 has been introduced is a block that generates a detected signal 521 indicating that a start/finish end has been detected when the light-receiving period indicated by the reel sense signal 511 is longer than a preset period.

Figure 8:
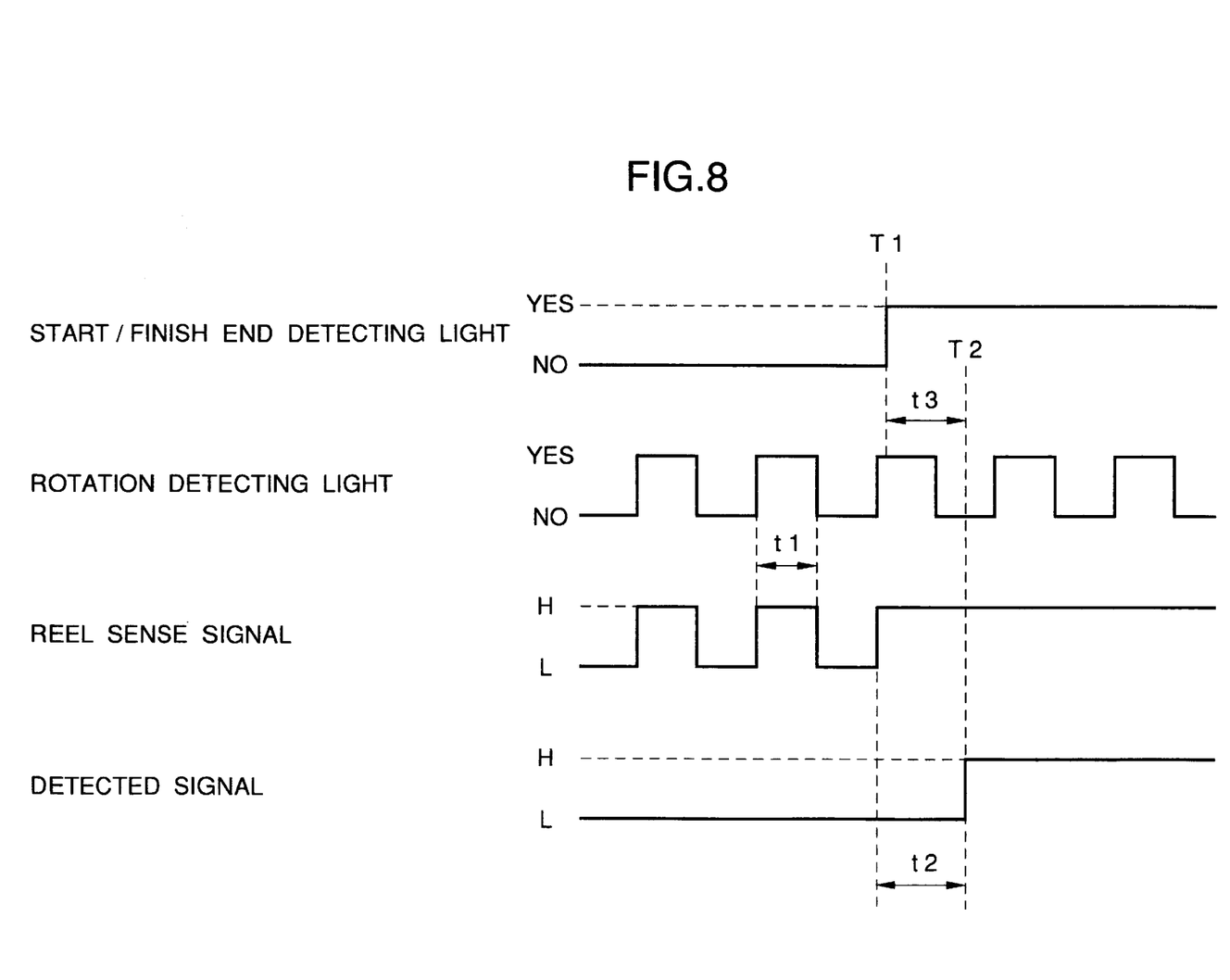
FIG. 8 is a timing chart showing changes in the intensity of an infrared ray and changes in major signals in another embodiment.

FIG. 8 is a timing chart showing changes in the intensity of an infrared ray and changes in major signals. The operation of this mode of embodiment will hereunder be described with reference to FIG. 8 whenever necessary.

During a period in which a magnetic substance applied portion of the video tape 69b crosses the optical path 68b (a period before a time T1 in which there is no start/finish end), no infrared ray (start/finish end detecting light) is radiated from the emergent light window 63b. As a result, it is only an infrared ray (rotation detecting light) that is guided to the light-receiving element 67b, the infrared ray having been radiated from the light-emitting section 41 and having transmitted through the moving path 421 of the light-shielding blade 72b. That is, only the infrared ray whose intensity changes in association with the rotation of the reel stand 71b is guided.

As a result, an H-level component indicating that an infrared ray has been received and an L-level component that an infrared ray has not been received appear alternately in an output of the light-receiving element 67b. Therefore, the reel sense signal 511 is a signal having H-level components and L-level components appearing alternately in accordance with the output of the light-receiving element 67b. That is, the reel sense signal 511 is a signal indicating the rotational speed of the reel stand 71b.

On the other hand, when a start/finish end of the video tape passes and a transparent leader portion of the video tape 69b thereafter appears (at the time T1), the start/finish end detecting light has been guided to the light-receiving element 67b. As a result, the reel sense signal 511 is thereafter kept at H-level.

The detected signal generating section 52 monitors the period in which the reel sense signal 511 is kept at H-level at all times. If the period in which the reel sense signal 511 is kept at H-level is shorter than a preset period (a period t2), then it is judged that the H-level component is derived from the rotation of the reel stand 71b. As a result, the detected signal generating section 52 judges that a start/finish end of the video tape has not been detected before the time T1, and sets the detected signal 521 at L-level indicating that a start/finish end has not been detected.

On the other hand, when a start/finish end appears on the video tape, the infrared ray from the emergent light window 63b is guided to the light-receiving element 67b, so that the reel sense signal 511 is kept at H-level. That is, the reel sense signal 511 is changed into a signal keeping H-level for a period longer than the period t2. As a result, the detected signal generating section 52 judges that the H-level component in the reel sense signal 511 derives from detection of a start/finish end when the H-component keeping period exceeds the period t2 (at a time T2). As a result, the detected signal generating section 52 indicates detection of a start/finish end by setting the detected signal 521 at H-level at a time T2.

A supplementary description will hereunder be given.

As is apparent from the aforementioned description, the period t2 may be set to any value as long as such value is longer than a period t1. Further, if the period t2 is set to a longer period, margins corresponding to various errors are increased so as to correspond to an increase in the period t2. However, a timing at which to detect a start/finish end is delayed so as to correspond to the increase in the period t2. Thus, in order to absorb errors caused by rotation and other errors caused by disturbances, and in order to decrease a delay in detecting a start/finish end, the period t2 is set to a value 1.5 times the period t1.

The delay in detecting a start/finish end will be described in more detail. From a time (time t1) at which a leader portion has been detected to a time (time T2) at which the detected signal 521 is set at H-level (the time indicating detection of a start/finish end), a period t3 for judgment is requisite. However, the period t3 must be shorter than the period t2 no matter when the leader portion appears. That is, the period t3 must be a period shorter than a value 1.5 times the period t1.

On the other hand, if there is a total of eight (8) light-shielding blades, the period t1 becomes equal to a period in which the reel stand 71b makes 1/16 revolution. Hence, the maximum delay (period t3) in judging detection of a start/finish end becomes equal to a period in which the reel stand 71b makes $1.5/16$ revolution. That is, the delay in judgment (period t3) is practically negligible.

Further, the period t1 is changed in accordance with recording in the long-period mode and various types of reproducing modes therefor, and recording in the normal mode and various types of reproducing modes therefor, and fast forward and rewind. As a result, the detected signal generating section 52 changes the period t2 so as to correspond to a change in the period t1, and sets the period t2 to a value 1.5 times the period t1 under any operating conditions.

It may be noted that the invention is not limited to the aforementioned embodiments. The light-distributing section may employ components such as optical fibers that can guide light rays radiated from the light-emitting element to desired positions (to positions close to the rotation indicators) without scattering the light rays.

The reel sense light-guiding section may employ components such as optical fibers that can guide light rays that have transmitted through the rotation indicators to the light-receiving elements.

Further, while the case where the rotation indicator is constructed of light-shielding blades that change the intensity of a light ray transmitting therethrough has been described, the intensity of a light ray being reflected by a rotation indicator may be changed as in the case of a plurality of light reflecting surfaces and the like formed on the lower surface of the reel stand.

Further, both the light-emitting element and the light-receiving elements for the start/finish end detecting device may be shared in common with the elements for detecting the rotation of reel stands.

Further, while the invention has been applied to video cassette decks, the invention may similarly be applied to, e.g., video cassette players, vide cameras, and the like.

A reel sensor according to the invention includes: a light-distributing section for distributing a ray of light radiated from a light-emitting element disposed on a start/finish end detecting device to a rotation indicator so as to correspond to the rotation of a reel stand, the rotation indicator serving to change an intensity of a ray of light either transmitting therethrough or being reflected thereby; and a light-receiving section for receiving a ray of light having been distributed by the light-distributing section and either having transmitted through the rotation indicator or having been reflected by the rotation indicator. That is, the ray of light radiated from the light-emitting element disposed on the start/finish end detecting device is not only radiated to the incident light window in order to detect a start/finish end, but also radiated to the rotation indicator by the light-distributing section. As a result, the reel sensor can detect the rotation of a reel stand without separately using a dedicated light-emitting element. Therefore, the number of light-emitting elements used can be reduced.

Further, in addition to the aforementioned construction, the light distributing section is a light-distributing prism having a reflecting surface formed thereon, the reflecting surface refracting a ray of light radiated from the light-emitting element toward the rotation indicator; and a light-emitting side prism being disposed on the start/finish end detecting device and refracting the ray of light radiated from the light-emitting element toward the incident light window is formed integrally with the light-distributing prism. That is, an optical path for detecting start/finish end and an optical path for detecting the rotation of a reel stand can be formed by a single integrated component. Therefore, optical paths can be formed with ease.

Further, in addition to the aforementioned constructions, a light-guiding section for guiding the ray of light distributed by the light-distributing section to a position close to the rotation indicator. That is, the ray of light for detecting the rotation of a reel stand is radiated at a position close to the rotation indicator. Therefore, unnecessary radiation can be minimized. As a result, an increase in the amount of light entering around the light-receiving element can be regulated. Therefore, impairment in operating accuracy can be prevented.

Further, in addition to the aforementioned constructions, the rotation indicator is constructed of light-shielding blades disposed on a gear rotating so as to interlock with the reel stand. That is, if the gear on which the light-shielding blades are disposed is located closer to the reel stand as viewed from the side of the light-emitting element, the distance from the light-emitting element to the light-shielding blades on the gear becomes shorter than the distance from the light-emitting element to the light-shielding blades on the reel stand. Therefore, optical paths can be shortened.

Further, a start/finish end detecting device according to the invention includes: a light-receiving element for receiving a ray of light radiated from an emergent light window formed in a video cassette; a reel sense light-guiding section for guiding a ray of light having transmitted through a rotation indicator or having been reflected by the rotation indicator to the light-receiving element, the rotation indicator serving to change an intensity of a ray of light either transmitting therethrough or being reflected thereby; a comparing section for generating a reel sense signal by slicing an output of the light-receiving element at a preset level; and a detected signal generating section for generating a detected signal indicating detection of the start/finish end when a light-receiving period indicated by the reel sense signal becomes longer than a preset period. That is, the light-receiving element for detecting the rotation of a reel stand is used also as the light-receiving element for detecting a start/finish end. As a result, a light-receiving element used for detecting the rotation of a reel stand can be dispensed with. On the other hand, the reel sense signal and the detected signal indicating detection of a start/finish end are mixed at the output of the comparing section. As a result, the detected signal generating section separates the reel sense signal from the detected signal indicating detection of a start/finish end based on the light-receiving period indicated by the reel sense signal. Therefore, the number of light-receiving elements can be reduced.

Further, in addition to the aforementioned construction, the start/finish end detecting device further includes: a light-receiving prism for refracting the ray of light radiated from the emergent light window in a light-receiving direction. In such start/finish end detecting device, the reel sense light-guiding section is a light-guiding prism for refracting a ray of light either having transmitted through the rotation indicator or having being reflected by the rotation indicator in a light-receiving direction of the light-receiving element, the light-receiving prism and the light-guiding prism being formed integrally with each other. That is, a light receiving path for detecting a start/finish end and a light-receiving path for detecting the rotation of a reel stand are formed by a single integrated component. Therefore, optical paths can be formed with ease.

What is claimed is:

1. A start/finish end detecting device radiating light into an incident light window formed in a video cassette and detecting a start/finish end of a video tape based on an intensity of light radiated from an emergent light window formed in the video cassette, the start/finish end detecting device, comprising:

a light-receiving element for receiving the light radiated from the emergent light window;

a reel sense light-guiding section for guiding light either having transmitted from the light-receiving element through a rotation indicator or having been blocked by the rotation indicator, the rotation indicator changing an intensity of the light by either transmitting the light therethrough or by blocking the light;

a comparing section for generating a reel sense signal having a first state if a start/finish end of the video tape is encountered and changing between the first state and a second state according to the rotation indicator if a start/finish end of the video tape is not detected; and a detected signal generating section for generating a detected signal indicating detection of the start/finish end when a light-receiving period indicated by the reel sense signal having the first state becomes longer than a preset period, wherein the light-receiving element includes a light-receiving prism for guiding the light radiated from the emergent light window toward the rotation indicator, and wherein the reel sense light-guiding section includes a light-guiding prism for guiding light either having transmitted through the rotation indicator or having been reflected by the rotation indicator to the light-receiving element.

2. The start/finish end detecting device according to claim 1, wherein the light-receiving prism and the light-guiding prism are formed integrally with each other.

3. A detecting device for detecting a start/finish end of a video tape of a video cassette and for detecting a rotation of the video cassette, comprising:

a single light emitting element emitting a light;

a rotation indicator serving to change an intensity of the light so as to correspond to rotations of the video cassette;

a light-distributing section for distributing a first portion of the light radiated from the light-emitting element to windows formed in the video cassette for detecting the start/finish end and a second portion of the light radiated from the light-emitting element to the rotation indicator;

a light-receiving section for receiving both the first and second portions of the light, wherein the light-receiving section includes two first light-receiving elements for receiving the first portion of the light from the respective windows of the video cassette, and a light-guiding section for guiding the second portion of the light from the rotation indicator to be detected.

4. A detecting device for detecting a start/finish end of a video tape of a video cassette and for detecting of rotation of the video cassette, comprising:

a single light emitting element emitting a light;

a rotation indicator serving to change an intensity of the light so as to correspond to rotations of the video cassette;

a light-distributing section for distributing a first portion of the light radiated from the light-emitting element to windows formed in the video cassette for detecting the start/finish end and for distributing a second portion of the light radiated from the light-emitting element to the rotation indicator; and a light-receiving section for receiving the first and second portions of the light wherein the light-receiving section includes two light-receiving elements for receiving the first portion of the light from the respective windows of the video cassette, and two light-guiding sections for guiding the portion of light from the rotation indicator to be detected.

5. A detecting device for detecting a start/finish end of a video tape of a video cassette and for detecting a rotation of the video cassette, the video cassette having an incident-light window and emergent-light window, the detecting device comprising:

a light emitting element for emitting a light;

a rotation indicator to change an intensity of light provided thereto according to rotations of the video cassette;

a first light-guiding section for distributing a first portion of the emitted light from the light emitting element to the incident-light window;

a second light-guiding section for distributing a second portion of the emitted light to the rotation indicator;

at least one light-receiving element for receiving light from the emergent light window; and at least one light-receiving section for receiving the second portion of the emitted light after passing through the rotation indicator, wherein the start/finish end is detected according to a change of intensity of the first portion of the emitted light passed between the emergent light window to the at least one light-receiving element, and wherein the rotations of the video cassette are detected according to a change of intensity of the second portion of light passed from the second light-guiding section through the rotation indicator to the light-receiving section.

6. The detecting device according to claim 5, wherein the second light-guiding section faces the light-receiving section defining a space therebetween.

7. The detecting device according to claim 6, wherein the rotation indicator includes blades that pass through the space.

8. The detecting device according to claim 7, wherein the blades are disposed on a rotatable reel stand of a video cassette recorder.

9. The detecting device according to claim 7, wherein the blades are disposed on a gear rotatably interlocked with a reel stand of a video cassette recorder.

10. The detecting device according to claim 5, wherein the first light-guiding section includes a light-guiding prism having a reflecting surface formed integrally therewith, the light-guiding prism receiving light emitted from the light-emitting element in an upward direction and reflecting the received light in a horizontal direction to the incident-light window.

11. The detecting device according to claim 5, wherein the second-light guiding section includes a light-guiding prism having a reflecting surface formed integrally therewith, the light-guiding prism receiving light from the light emitting elements and reflecting the received light toward the rotation indicator.

12. The detecting device according to claim 11, wherein the light-guiding prism guides the received light to a position adjacent the rotation indicator.

13. The detecting device according to claim 5, further comprising a light-receiving prism facing the light-emergent window to receive and to guide the first portion of the emitted light to the at least one light-receiving element.

14. A video cassette recorder having a detecting device for detecting a start/finish end of a video tape of a video cassette and for detecting a rotation of the video cassette, the video cassette having an incident-light window and emergent-light window, the video cassette recorder comprising:

a reel stand interfaced with the video cassette to drive the video tape;

a light emitting element for emitting light;

a rotation indicator to change an intensity of light provided thereto according to rotations of the reel stand;

a first light-guiding section for guiding a first portion of the emitted light from the light emitting element to the incident-light window;

a second light-guiding section for guiding a second portion of the emitted light to the rotation indicator;

at least one light-receiving element for receiving light from the emergent light window; and at least one light-receiving section for receiving the second portion of the emitted light after passing through the rotation indicator, wherein the start/finish end is detected according to a change of intensity of the first portion of the emitted light passed between the emergent light window to the at least one light-receiving element, and wherein the rotations of the video cassette are detected according to a change of intensity of the second portion of light passed from the second light-guiding section through the rotation indicator to the light-receiving section.

15. A video cassette recorder having a detecting device for detecting a first light transmitted between an incident-light window and an emergent-light window of a video cassette indicating a start/finish end of a video tape of the video cassette and for detecting a second light indicating rotation of the video cassette, the video cassette recorder comprising:

a reel stand to interface with the video cassette for driving the video tape;

a first light emitting element for emitting the first light to be passed between the incident-light window and the emergent-light window;

a light-receiving element for receiving both the first light and the second light;

a first light-guiding section for guiding the first light from emergent-light window to the light receiving element;

a second light emitting element for emitting the second light;

a rotation indicator to change an intensity of the second light according to the rotation of the reel stand; and a second light-guiding section for guiding the second light from the rotation indicator to the light receiving element.

16. A detecting device for detecting a first light transmitted between an incident-light window and an emergent-light window of a video cassette indicating a start/finish end of a video tape of the video cassette and for detecting a second light indicating rotation of the video cassette, the detecting device comprising:

a first light emitting element for emitting the first light to be passed between the incident-light window and the emergent-light window;

a light-receiving element for receiving both the first light and the second light;

a first light-guiding section for guiding the first light from emergent-light window to the light receiving element;

a second light emitting element for emitting the second light;

a rotation indicator to change an intensity of the second light according to the rotation of the video cassette; and a second light-guiding section for guiding the second light from the rotation indicator to the light receiving element.

17. The detecting device according to claim 16, wherein the second light-guiding section faces the second light emitting element defining a space therebetween.

18. The detecting device according to claim 17, wherein the rotation indicator includes blades that pass through the space.

19. The detecting device according to claim 18, wherein the blades are disposed on a rotatable reel stand of a video cassette recorder.

20. The detecting device according to claim 18, wherein the blades are disposed on a gear rotatably interlocked with a reel stand of a video cassette recorder.

21. The detecting device according to claim 16, wherein the first light-guiding section includes a light-guiding prism having a reflecting surface formed integrally therewith, the light-guiding prism receiving light emitted from the light-emitting element in an upward direction and reflecting the received light in a horizontal direction to the incident-light window.

22. The detecting device according to claim 16, wherein the second-light guiding section includes a light-guiding prism having a reflecting surface formed integrally therewith, the light-guiding prism receiving light from the light emitting elements and reflecting the received light toward the rotation indicator.

23. The detecting device according to claim 22, wherein the light-guiding prism guides the received light to a position adjacent the rotation indicator.

24. The detecting device according to claim 16, wherein the first and second light-guiding sections are formed integrally with each other.

* * * * *